June 6, 1944.   H. W. AMOS   2,350,711
BELLOWS CUSHION FOR UPHOLSTERY
Filed Dec. 12, 1941

INVENTOR
HOWARD W. AMOS
BY Bodell Thompson
ATTORNEYS

Patented June 6, 1944

2,350,711

UNITED STATES PATENT OFFICE 2,350,711

BELLOWS CUSHION FOR UPHOLSTERY

Howard W. Amos, Syracuse, N. Y., assignor of one-third to Timothy B. McCarthy, Syracuse, N. Y., and one-third to James D. Clark, Chicago, Ill.

Application December 12, 1941, Serial No. 422,736

1 Claim. (Cl. 155—179)

This invention relates to cushions for upholstery for use as seats, backs, etc., and has for its object a cushion for upholstery which includes a plurality of resilient, air-tight bellows cylindrical in general form.

It further has for its object a construction embodying bellows which are air-tight and sealed at their ends to a base layer and a top layer, the layers being preferably of rubber, and the bellows being of rubber and integrally united, as by vulcanizing or cementing to the layers.

The invention consists in the novel features and in the combinations and constructions hereinafter set forth and claimed.

In describing this invention, reference is had to the accompanying drawing in which like characters designate corresponding parts in all the views.

Figure 1:
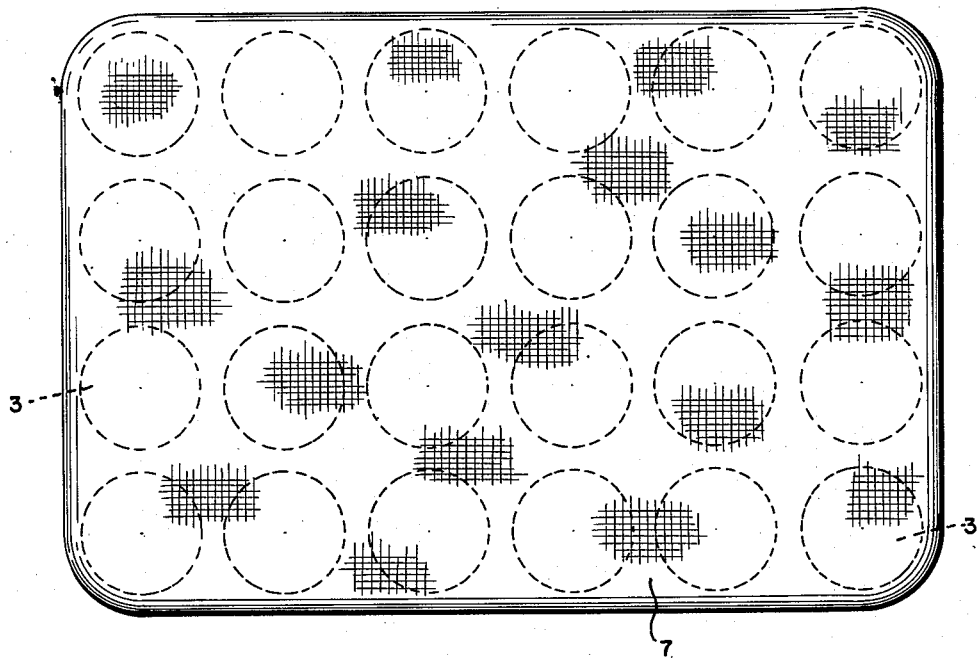
Figure 1 is a plan view of a seat or back structure embodying this invention.
Figure 2:
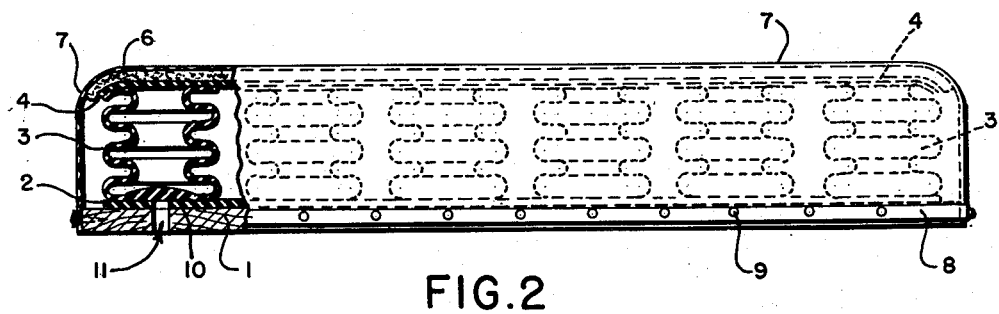
Figure 2 is a side elevation, partly broken away.

This cushion for upholstery includes a unit comprising a base layer, a covering including a top layer and a plurality of resilient air-tight bellows between said layers, each bellows being secured at their opposite ends to the layers respectively. The cushion unit is supported on a suitable base plate and enclosed in a cover.

1 designates the base plate, and 2 a base strip overlying the base plate, this strip being preferably of rubber. 3 designates resilient bellows, preferably of rubber or similar air-tight elastic resilient material, the bellows being interposed between the base layer 2 and the top layer, this top layer also being preferably elastic and usually rubber or similar material. The bellows are sealed at their ends to the layers 2 and 4 respectively, as by vulcanizing, cementing or otherwise integrally uniting the parts together. These bellows are preferably cylindrical. The covering also includes an intermediate layer 6 of felt or suitable material and an outer finishing cover piece enclosing the area of the bellows, the top layer 4 and felt layer 6, the margin of the cover piece 7 being secured to the edge of the base 1, as by a fastening strip 8 secured to the base 1 by fastening members or tacks 9. The unit consisting of the base layer 2, top layer 4 and bellows 3 are usually assembled in a room where the atmosphere is above atmospheric pressure, so that the air in the bellows remains above atmospheric pressure over a long indefinite period of time.

A cushion so constructed remains in its original form and does not develop a dilapidated appearance after long use. It is as efficient and more economical than the expensive structures embodying sponge rubber or airfoam cushions and is more comfortable as it does not retain heat to the degree that sponge rubber cushions do. The bellows remain in original form indefinitely and do not become distorted or cause the cushion to develop the dilapidated appearance of stuffed cushions and cushions embodying coiled springs. Another item resulting in economy is the bellows have no valve-controlled passages, so that the cushion unit is merely air-tight bellows sealed to the base and top layers.

However, in the event the bellows or any of them settle and give a dilapidated appearance to the cushion, means is provided by which they may be easily inflated and reset to their normal position. This means consists of a self-sealing material in the head of the bellows, or in at least one wall or head of each bellows or in the portion of the base layer 2 or the top layer 4 overlapping the ends of the bellows. This material is of the nature used in puncture-proof tires and in the bladders of basket balls and foot balls and the like to eliminate the use of a stem and valve through which the bladder can be inflated. It is the product of the Goodrich Tire and Rubber Company. As here shown, the base layer 2 is provided with self-sealing or self-filling material at 10 where it extends under the bellows, and the base plate 1 is formed with a perforation 11, one for each bellows through which a hollow needle can be passed and pushed through the layer 2 and the sealing material at 10 and into the bellows, so that air under pressure can be filled into the bellows through the needle to any desired pressure to reset the bellows in its original position. As the needle is pulled out, the material fills into the perforation made by the needle and seals the perforation. Such resetting operations are necessary only after a long indefinite period of time. This means of resetting the bellows results in economy in manufacture for the reason that no stems and valves are necessary.

Another advantage of this cushion is that the bellows are independent of each other or not connected by equalizing passages or passages through which all of them might be filled at the same time. The bellows being individual, the weight of a person sitting on one portion of the cushion does not affect the bellows on another portion of the cushion, and further because the bellows are individual and there are no filling or equalizing passages, the cushion can be efficiently manufactured at a comparatively low cost.

What I claim is:

A cushion for upholstery including a base layer, a top layer, and a plurality of air tight bellows cylindrical in general form between the layers, each bellows being imperforate, so as to be without holes and hence sealed against inlet and outlet of air, each bellows being also secured at its opposite ends to said layers respectively, each bellows being independent of and with its interior disconnected from the other bellows, at least one of the walls of each bellows being provided with a self-sealing material for sealing up punctures made therein for the purpose of forcing air under pressure thereinto.

HOWARD W. AMOS.